(No Model.)

R. S. HUNZEKER.
VEHICLE SPRING.

No. 295,176. Patented Mar. 18, 1884.

Witnesses
Jno. K. Smith
Thomas W. Bakewell

Inventor
Rudolph S. Hunzeker
by his attorneys
Bakewell & Kerr

UNITED STATES PATENT OFFICE.

RUDOLPH S. HUNZEKER, OF PITTSBURG, PENNSYLVANIA, ASSIGNOR TO HIMSELF AND WILLIAM A. HERRON, OF SAME PLACE.

VEHICLE-SPRING.

SPECIFICATION forming part of Letters Patent No. 295,176, dated March 18, 1884.

Application filed August 9, 1883. (No model.)

*To all whom it may concern:*

Be it known that I, RUDOLPH S. HUNZEKER, of Pittsburg, in the county of Allegheny and State of Pennsylvania, have invented a new and useful Improvement in Vehicle-Springs; and I do hereby declare the following to be a full, clear, and exact description thereof.

My invention relates to an improvement in vehicles; and it consists in interposing a semi-elliptical spring between the ends of the side springs and the rear axle, the front ends of the side springs being connected to the head-block or like rigid support, while the rear ends of the side springs are shackled to the ends of the semi-elliptical spring, which is secured to the front side of the rear axle by clips or bolts, its concavity being toward the front axle, whereby the axle is relieved of all tendency to wabble, due to the action of the springs, while any torsional or twisting motion of the bed is counteracted, all as will hereinafter more fully appear.

In vehicles where what are known as "side springs" are used, the ends of the springs being commonly shackled to the head block or bar and to the rear axle, when the springs are depressed by the weight of the loaded vehicle there is a strong force bearing against the axles, tending to push them away from each other in opposite directions. This produces a strain on the axles and braces, and also causes the forward wheels to wabble or deviate from a straight line in their course. The object of my invention is to relieve this pressure and to direct it in such a manner as not to affect the axles nor interfere with the direct course of the wheels, and at the same time brace the body and side springs against torsional motion.

I will now describe my invention so that others skilled in the art may manufacture and use the same, reference being had to the accompanying drawings, forming part of this specification, in which—

Figure 1:
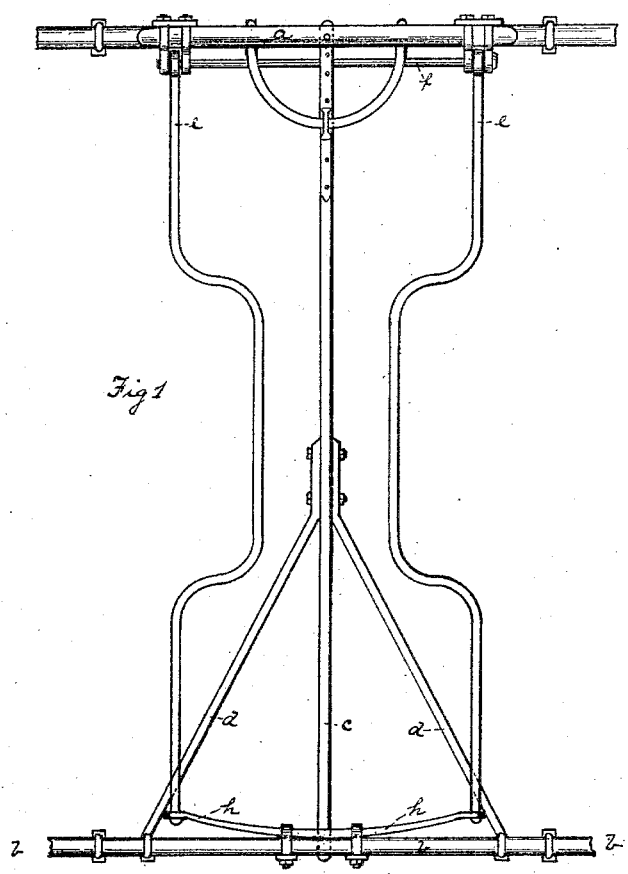
Figure 2:
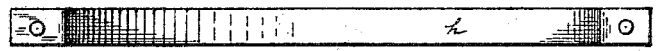

Figure 1 is a plan view, showing the axles, top bar, side spring, and braces of a vehicle with my improved device attached thereto; and Fig. 2 is a perspective view of the semi-elliptical spring.

Like letters of reference indicate like parts wherever they occur.

In the drawings, A represents the head-bar of the vehicle resting on the forward axle, and secured thereto by a king-bolt, in the usual manner. The rear axle, B, is connected to the top bar by the perch C. Braces or stays D extend from this perch to the rear axle, near the ends thereof. The front ends of the side springs, E, which springs may be of any suitable kind and form, are shackled by clips and bolts or rod F to the head-bar A or like rigid support. The rear end of the side springs, E, are bolted or otherwise secured to the end of the semi-elliptical spring H, which is clamped by clips and bolts at or near its middle portion to the front side of the rear axle, the concavity of the spring facing the forward axle, B. The effect of this is to remove the motion of the springs E from the axle to the ends of the elliptical spring H, while the parallelism of the springs e is preserved, their front ends being fixed, and whatever force is imparted to the axle is at a point near the middle thereof, where the perch C connects the axle with the head-block. The wabbling and unsteady motion of the forward wheels is thereby obviated, as the motion, instead of acting on the forward axle, acts on the arms of the semi-elliptical spring. This spring H may be formed of a single leaf or plate of steel, or otherwise, as is found most suitable for different kinds of vehicles.

The advantages of my invention are that the vehicle runs in a true line, easily, and without strain on the wheels, axles, and braces.

I am aware that heretofore parallel side springs have been shackled at both extremities to transverse springs secured to the axle and head-block to relieve the axle of the thrust of the side springs, and do not herein claim such a construction, as, unless the side springs have some fixed points of support, there will be a tendency of the bed or body to torsional motion.

Having thus described my invention, what I claim, and desire to secure by Letters Patent, is—

1. In a side-spring vehicle, the combination, with the head-block or like rigid transverse bar, of two side springs shackled thereto and a semi-elliptic spring arranged with its concavity forward, clipped near its middle to the rear axle, and connected by its ends with the side springs, substantially as and for the purposes specified.

2. In a side-spring vehicle, the combination, with the bed and running-gear, of two side springs, a rigid transverse bar to which the side springs are connected at one end, and a semi-elliptic spring or spring-bar to which the side springs are connected at their opposite ends, substantially as and for the purposes specified.

In testimony whereof I have hereunto set my hand this 6th day of August, A. D. 1883.

RUDOLPH S. HUNZEKER.

Witnesses:
W. B. CORWIN,
T. W. BAKEWELL.